3,850,989
2,2,2 - TRICHLORO - 4' - TERT BUTYL-
ACETOPHENONE

Reginoldus Havinga, Schalkhaar, and Pieter Dirk Swaters, Lochem, Netherlands, assignors to Akzo N.V., Arnhem, Netherlands
No Drawing. Filed Apr. 3, 1973, Ser. No. 347,563
Claims priority, application Netherlands, Apr. 21, 1972, 7205384
Int. Cl. G07c 49/80
U.S. Cl. 260—592                    1 Claim

ABSTRACT OF THE DISCLOSURE

A process for curing acid-curable resins with photocatalyst compounds having the general formula:

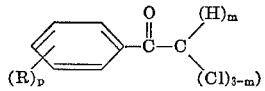

wherein $m=0$, 1 or 2 and $p$ is an integer from 1 to 5 and wherein, when $p$ is 1, R represents an alkyl or alkoxy group having at least 4 C-atoms, and when $p>1$, R represents alkyl or alkoxy groups having together at least 4 C-atoms. The photocatalyst which may be used is 2,2,2-trichloro-4'-tert - butylacetacetophenone. This compound may be prepared by chlorinating 4'-tert-butylacetophenone or by treating tert-butyl benzene in carbon disulfide with trichloroacetyl chloride or trichloroacetonitrile and aluminum chloride.

---

The present invention relates to acid-curable resins and is concerned in particular with a process for curing such resins using a photocatalyst, with a new photocatalyst and its process of preparation to be used in the curing process according to the present invention and with the resultant resins obtained by the curing process of the present invention.

It is known that resins, such as phenol resins and amino resins, particularly urea resins and melamine resins, may be cured separately or in combination with other resins, such as alkyd resins, by irradiation with ultra-violet light. For this purpose, compounds which cause curing of the resin or resin mixtures by generating acids under irradiation have to be incorporated in the resin or resin mixtures. Examples of such compounds which have already been proposed include halogen-containing compounds, such as bromoform, idoform, carbon tetrabromide, hexabromo-ethane, bromal and 2,5-dimethyl-ω-tribromo-acetophenone.

It is economically advantageous to replace such bromine or iodine-containing compounds by chlorine-containing compounds. However, such chlorine-containing compounds generally have the drawback that they are less effective as photocatalysts for acid-curing resins.

It has now been found that compounds having the general formula:

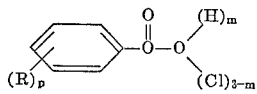

in which $m=0$, 1 or 2 and $p$ is an integer from 1 to 5 and wherein when $p$ is 1, R represents an alkyl or alkoxy group having at least 4 C-atoms, and when $p$ is $>1$, R represents alkyl or alkoxy groups having together at least 4 C-atoms, are excellently suited for being used as photocatalysts for acid-curing resins, because they possess a high effectivity.

Moreover, the trichloro-compounds to be used according to the present invention have the advantage that they dissolve more easily in lacquers at room temperature as compared with the corresponding tribromo-compounds. Moreover, lacquers containing compounds according to the present invention have a better stability on storage in the dark than lacquers containing the corresponding bromine-containing compounds, as illustrated in the following Table. The viscosity referred to in this table was determined by measuring the time needed for a steel ball, weighing 33 mg. and having a diameter of 2.0 mm., to fall 130 mm. through a vertical column of the lacquer having a diameter of 14 mm. and then converting this time into poises. The lacquer used is described in Example I below. The compounds used are 2,2,2-trichloro-4'-tert-butylacetophenone (A) and the corresponding tribromo derivative (B).

| Comp. | Quantity by weight | Viscosity at 70° after stated number of days | | | | | | Viscosity at 40° after stated number of days | |
|---|---|---|---|---|---|---|---|---|---|
| | | 0 | 1 | 5 | 9 | 12 | 19 | 0 | 30 |
| A | 1% | 0.4 | 0.6 | 1.1 | 3.2 | ±6 | g | 1.1 | 1.8 |
| A | 2% | 0.6 | 0.7 | 1.0 | 1.9 | ±6 | g | 1.1 | 1.7 |
| B | 1% | 0.6 | 0.8 | >16 | g | | | 1.1 | 3.3 |
| B | 2% | 0.8 | 1.0 | g | | | | 1.2 | 3.8 |

NOTE.—g=gellified.

Illustrative examples of compounds according to the general formula hereinbefore defined are: 2-chloro-4'-tert.butylacetophenone; 2,2 - di-chloro-4'-tert.butylacetophenone; 2-chloro-4' - octylacetophenone; 2,2 - di-chloro-4'-octylacetophenone; 2 - chloro - 4'-n-C$_{8-13}$-alkylacetophenone; 2,2-dichloro - 4'-n-C$_{8-13}$-alkylacetophenone; 2,2,2-trichloro-4'-n-C$_{8-13}$ alkylacetophenone in which the alkyl groups range from 8-13 carbon atoms (derived from C$_{8-13}$ alkylbenzene with the trade name Dobane 83 X); 2,2-dichloro-4'-octyloxyacetophenone; 2,2,2 - trichloro-4'-octyloxyacetophenone; 2,2-dichloro-2',4' - diisopropylacetophenone; 2,2,2-trichloro-2',4' - diisopropylacetophenone or mixtures of these compounds. Preferably, however, the new compound 2,2,2-trichloro - 4'-tert.butylacetophenone is used. This compound may be prepared in an analogous way to that described in J.A.C.S. 72 (1950) pages 3952–3 for the preparation of trichloroacetophenone, namely by treating 4-tert.butylacetophenone with chlorine. The starting 4-tert.butylacetophenone may be obtained in the manner described in J.A.C.S. 68 (1946) page 1107 by a Friedel-Crafts acetylation of tert - butylbenzene with acetyl chloride in a solvent, such as carbon tetrachloride. The compound 2,2,2 - trichloro-4'-tert.butylacetophenone may also be obtained in an analogous way to that described in Houben-Weyl 5/3, page 790 for the preparation of trichloro-2',4',6' - trimethylacetophenone. The compound may also be prepared directly by a Friedel-Crafts reaction of tert.butylbenzene with trichloroacetyl chloride in carbon disulphide as described in J. Indian Chem. Soc. 26 (1947), pages 287–9. It is also possible to use trichloroacetonitrile instead of trichloro-acetyl chloride as described in J. Prakt. Chem. (2) 123 (1929), 313.

Suitable resins which may be cured by making use of the photocatalysts according to the invention are, for example, urea and melamine resins separately or in combination with other resins, such as alkyd resins. The photocatalysts to be used according to the present invention may be incorporated in white or lightly pigmented lacquers to be put on any substrate, such as wood, metal or textile materials or those used for reproduction purposes.

The compounds to be used according to the present invention are usually added to the resins in quantities of 0.5–10% by weight, preferably 1–5% by weight calculated on the resin to be cured. They may be incorporated in the resin to be cured as such or dissolved in suitable solvents, such as isopropanol, xylene n-butanol or mixtures thereof, or mixed with an inert resin, such as an alkyd, resin by means of the usual techniques.

The acid-curing resins to be cured according to the present invention may be employed as lacquers or printing-inks. To this end, compositions consisting of the acid-curing resins and the selected photocatalysts are preferably dissolved in suitable solvents, such as isopropanol, xylene or n-butanol, are then applied to a substrate, such as wood, paper or a textile, and then cured with the aid of U.V. irradiation. In addition to the above-mentioned solvents, pigments, plasticizers and fillers may be incorporated in the compositions, if desired. The following examples illustrate without limitation the present invention. Parts and percentages are by weight unless otherwise stated.

EXAMPLE I

The photocatalysts mentioned hereinafter in Table 2 were added to a lacquer to be cured by acid, consisting of 50 parts of a 70% solution of an alkyd resin in an isopropanol-xylene mixture (ratio 9:1), mixed with 47.5 parts of a 60% solution of a urea resin in butanol and 2.5 parts of a 70% solution of a melamine resin in butanol. The alkyd resin had been prepared from a mixture consisting of 34% phthalic anhydride, a polyalcohol and a vegetable oil having a short oil length in an amount of 38%. The percentages indicated are based on the total amount of lacquer.

The mixtures obtained were spread on glass plates to a film-layer thickness of 100μ. These layers were irradiated with a Philips high pressure mercury lamp, type HTQ–4, at a distance of 20 cm. for 60 and 120 seconds. The results are tabulated in Table 2. The so-called Persoz-hardness was used as a measure for the curing, as described in French norm NF T 30016. The stability of the mixtures on storage in the dark at room temperature was determined by measuring the viscosity according to the method already described. After 4 weeks, no change in viscosity of any of the mixtures could be observed.

TABLE 2

| Photocatalyst | Quantity in percent | Irradiation time in sec. | Drying time in minutes to— Tack-free | Drying time in minutes to— Hard dry | Persoz-hardness in min. after 1, 7, or 21 days — 1 | Persoz-hardness in min. after 1, 7, or 21 days — 7 | Persoz-hardness in min. after 1, 7, or 21 days — 21 |
|---|---|---|---|---|---|---|---|
| Without photocatalyst | | 60 | 90 | >1,500 | 55 | 66 | 75 |
| | | 120 | 25 | >1,500 | 60 | 71 | 86 |
| 2-chloro-4'-tert.butylacetophenone | 1.0 | 60 | 8 | 25 | 187 | 273 | 307 |
| | | 120 | 1 | 8 | 199 | 293 | 321 |
| | 2.0 | 60 | 5 | 18 | 213 | 292 | 324 |
| | | 120 | 1 | 3 | 205 | 295 | 310 |
| 2,2-dichloro-4'-tert.butylacetophenone | 0.25 | 120 | 8 | 100 | 113 | 196 | 231 |
| | 0.50 | 60 | 8 | 37 | 220 | 280 | 302 |
| | | 120 | 2 | 28 | 195 | 286 | 316 |
| | 1.0 | 60 | 5 | 21 | 244 | 295 | 304 |
| | | 120 | 1 | 4 | 236 | 288 | 305 |
| | 2.0 | 60 | 3 | 15 | 236 | 283 | 315 |
| | | 120 | 1 | 2 | 241 | 292 | 308 |
| | 4.0 | 60 | 2 | 6 | 215 | 273 | 295 |
| | | 120 | 0 | 1 | 225 | 280 | 294 |
| 2,2,2-trichloro-4'-tert.butylacetophenone | 0.25 | 120 | 5 | 32 | 173 | 260 | 268 |
| | 0.50 | 60 | 5 | 16 | 223 | 286 | 304 |
| | | 120 | 2 | 4 | 204 | 288 | 310 |
| | 1.0 | 60 | 2 | 8 | 256 | 295 | 308 |
| | | 120 | 0 | 2 | 242 | 298 | 325 |
| | 2.0 | 60 | 1 | 5 | 256 | 279 | 302 |
| | | 120 | 0 | 1 | 238 | 280 | 308 |
| | 4.0 | 60 | 1 | 2 | 230 | 254 | 271 |
| | | 120 | 0 | 0 | 228 | 258 | 292 |
| 2-chloro-4'-octylacetophenone | 1.0 | 60 | 14 | 50 | 158 | 267 | 286 |
| | | 120 | 0 | 21 | 184 | 278 | 314 |
| | 2.0 | 60 | 5 | 15 | 233 | 294 | 316 |
| | | 120 | 0 | 2 | 238 | 308 | 320 |
| 2,2-dichloro-4'-octylacetophenone | 1.0 | 60 | 5 | 27 | 231 | 291 | 314 |
| | | 120 | 0 | 5 | 225 | 306 | 322 |
| | 2.0 | 60 | 2 | 8 | 143 | 196 | 316 |
| | | 120 | 0 | 1 | 245 | 316 | 328 |
| 2-chloro-4'-n-alkylacetophenone [1] | 1.0 | 60 | 6 | >60 | 137 | 282 | 300 |
| | | 120 | 3 | 24 | 166 | 282 | 306 |
| | 2.0 | 60 | 2 | 38 | 231 | 308 | 320 |
| | | 120 | 1 | 4 | 256 | 302 | 334 |
| 2,2-dichloro-4'-n-alkylacetophenone [1] | 1.0 | 60 | 4 | 31 | 226 | 319 | 332 |
| | | 120 | 1 | 6 | 235 | 320 | 331 |
| | 2.0 | 60 | 2 | 13 | 252 | 305 | 330 |
| | | 120 | 0 | 3 | 260 | 304 | 322 |
| 2,2,2-trichloro-4'-n-alkylacetophenone [1] | 2.0 | 120 | 0 | 2 | 235 | 308 | 327 |
| 2,2-dichloro-4'-octyloxyacetophenone | 2.0 | 120 | 0 | 2 | 231 | 312 | 328 |
| 2,2,2-trichloro-4'-octyloxyacetophenone | 2.0 | 120 | 0 | 2 | 230 | 302 | 322 |
| 2,2-dichloro-2',4'-diisopropylacetophenone | 2.0 | 120 | 0 | 2 | 216 | 300 | 306 |
| 2,2,2-trichloro-2',4'-diisopropylacetophenone | 2.0 | 120 | 0 | 2 | 221 | 305 | 311 |

[1] By which the alkyl group varies from 8 to 13 carbon atoms (derived from $C_{8-13}$ alkylbenzene with the trade name Dobane 83 X).

EXAMPLE II 1.0 and 2.0 parts respectively of photo catalysts were added to a lacquer to be cured by acid consisting of 41.6 parts of a 60% solution of an alkyd resin in xylene, mixed with 41.6 parts of a 60% solution of a non-plasticized, butylized urea formaldehyde resin in butanol and made up to 100 parts with 9.6 parts of isopropanol and 7.2 parts of butanol. The alkyd resin was prepared from a mixture consisting of 40% of phthalic acid anhydride, a polyalcohol and 42% of oil rich in linolic acid. The results obtained after curing are tabulated in Table 3.

TABLE 3

| Photocatalyst | Quantity in percent | Irradiation time in sec. | Drying time in minutes to hard dry | Persoz-hardness in minutes after 1, 7, or 21 days | | |
|---|---|---|---|---|---|---|
| | | | | 1 | 7 | 21 |
| Without photocatalyst | | 60 | >500 | 52 | 67 | 78 |
| | | 120 | >500 | 58 | 72 | 91 |
| 2,2-dichloro-4'-tert. butyl-acetophenone | 1.0 | 60 | 41 | 152 | 270 | 293 |
| | | 120 | 16 | 175 | 270 | 296 |
| | 4.0 | 60 | 32 | 200 | 279 | 302 |
| | | 120 | 2 | 236 | 305 | 317 |

EXAMPLE III 1.0 and 2.0 parts respectively of the photocatalysts mentioned in Table 4 were added to a lacquer to be cured by acid consisting of 83.2 parts of a 60% solution of an internally plasticized urea resin in a butanol-xylene mixture (ratio 2:8), made up to 100 parts with 9.6 parts of isopropylalcohol, 1.1 parts of butanol and 6.1 parts of xylene. The results obtained after curing are tabulated in Table 4.

TABLE 4

| Photocatalyst | Quantity in percent | Irradiation time in sec. | Drying time in minutes to hard dry | Persoz-hardness in minutes after 1, 7, or 21 days | | |
|---|---|---|---|---|---|---|
| | | | | 1 | 7 | 21 |
| Without photocatalyst | | 60 | >500 | 50 | 63 | 82 |
| | | 120 | >500 | 61 | 74 | 96 |
| 2,2-dichloro-4'-tert. butyl-acetophenone | 1.0 | 60 | 18 | 112 | 240 | 236 |
| | | 120 | 10 | 134 | 208 | 247 |
| | 4.0 | 60 | 20 | 148 | 226 | 253 |
| | | 120 | 3 | 152 | 239 | 259 |
| 2,2,2-trichloro-4'-tert. butyl acetophenone | 1.0 | 60 | 10 | 127 | 213 | 250 |
| | | 120 | 6 | 135 | 209 | 253 |
| | 2.0 | 60 | 8 | 164 | 240 | 261 |
| | | 120 | 0 | 176 | 245 | 274 |

EXAMPLE IV 514 grams (3.85 mol) of anhydrous aluminum chloride was put into 2 liters of carbon tetrachloride. While stirring vigorously, 302 grams (3.85 mol) of acetylchloride was added over a period of 1 hour at a temperature below 10° C. Subsequently, 469 grams (3.5 mol) of tert.-butylbenzene was added to the reaction mixture over a period of 3 hours at a temperature below 5° C. After stirring for 1 hour without cooling, the reaction mixture was poured into a mixture of 500 milliliters of water, 1.7 kilograms of ice and 150 milliliters of 35% hydrochloric acid. The organic phase was separated, washed to neutrality and dried. After the solvent had been distilled off, 600 grams of 4'-tert.butylacetophenone was obtained having a refractive index $n_D^{20}=1.5212$. 444 grams (2.02 mol) of the above-described 4'-tert.butylacetophenone was mixed with 1.25 liters of glacial acetic acid and heated to 60° C. while stirring. Subsequently, at a reaction temperature of about 60° C., 375 grams (5.28 mol) of gaseous chlorine was passed into the reaction mixture for 4½ hours. After the reaction mixture had been freed from hydrogen chloride gas and the excess of chlorine by passing through nitrogen, 414 grams (5.05 mol) of anhydrous sodium acetate was added and then the reaction mixture was heated to 95° C. Subsequently, another 185 grams (2.60 mol) of gaseous chlorine was passed into the reaction mixture for 2 hours at a temperature of about 95° C. The excess chlorine was again removed with the aid of nitrogen and then the hot reaction mixture was filtered. After the addition of 63 milliliters of water, the clear filtrate was cooled to room temperature, which caused 2,2,2-trichloro-4'-tert.butylacetophenone to crystallize out. After filtering off by suction, washing and drying, 530 grams of white crystalline final product was obtained, having a melting point of 61.5°–62.5° C.

EXAMPLE V 36.4 grams (0.2) of trichloroacetylchloride, 26.84 grams (0.2 mol) of tert.butylbenzene and 26.7 grams (0.2 mol) of anhydrous aluminum chloride were added to 250 milliliters of carbon disulphide. The reaction mixture was heated slowly until reflux and stirred, while refluxing, for 3 hours. After the solvent had been distilled off, 35.1 grams of a viscous oil was obtained. After recrystallization from 90% ethyl alcohol, 13.6 grams of 2,2,2-trichloro-4'-tert.butylacetophenone was obtained in a white crystalline form. Melting point: 59°–62° C.; yield: 24%.

What is claimed is:

1. 2,2,2-Trichloro-4'-tert.butylacetophenone.

References Cited

FOREIGN PATENTS 71,245   5/1970   East Germany _____ 260—592

OTHER REFERENCES

Houben-Weyle 5/3, p. 790 (1962).
Cohen et al., J. Am. Chem. Soc. 72, 3952–3953 (1950).

DANIEL D. HORWITZ, Primary Examiner

U.S. Cl. X.R.

204—159,19; 117—93.31; 204—159.18